United States Patent [19]
Kownacki et al.

[11] Patent Number: 5,956,892
[45] Date of Patent: Sep. 28, 1999

[54] LAWN AND GARDEN EDGING WITH WATERING CAPABILITY

[75] Inventors: Charles D. Kownacki, Erie; Franklin T. Clark, Jr., Girard; Stephen M. Oas; John C. Ramsey, both of Erie, all of Pa.

[73] Assignee: EMSCO, Inc., Girard, Pa.

[21] Appl. No.: 09/100,898

[22] Filed: Jun. 19, 1998

[51] Int. Cl.$^6$ .................................................. A01G 1/08
[52] U.S. Cl. ................................ 47/33; 52/102; 239/276
[58] Field of Search ........................... 47/33; 52/102; 239/276; 404/7, 8

[56] References Cited

U.S. PATENT DOCUMENTS

| | | | |
|---|---|---|---|
| 5,119,587 | 6/1992 | Waltz | 47/33 |
| 5,232,159 | 8/1993 | Abbate et al. | 239/276 |
| 5,535,545 | 7/1996 | Matz | 47/33 |
| 5,755,383 | 5/1998 | Joseph | 239/276 |

Primary Examiner—Robert P. Swiatek
Assistant Examiner—Jeffrey L. Gellner
Attorney, Agent, or Firm—Richard K Thomson

[57] ABSTRACT

Lawn edging is made in discrete, rigid one foot sections each with an integral water conduit with sprinkling orifices, each section having an integral male fitting at one end and a female fitting at the other. The two fittings are oriented in a vertical direction and define a pivot axis for adjacent edging sections. The conduit is generally trapezoidal in shape and has a flat upper surface which serves as a force-receiving surface. A special section has a hose attachment to permit distribution of water in one or both directions from the special section. A bottom section is divided into subsections with each section having insertion facilitating elements including v-shaped points and a sharpened leading edge and removal inhibiting elements including teeth formed on a v-shaped tangential flange. A reinforcing flange divides the bottom portion from the upper portion which, in addition to supporting the water conduit, has a plurality of reinforcing ribs extending between the reinforcing flange and the water conduit.

17 Claims, 3 Drawing Sheets

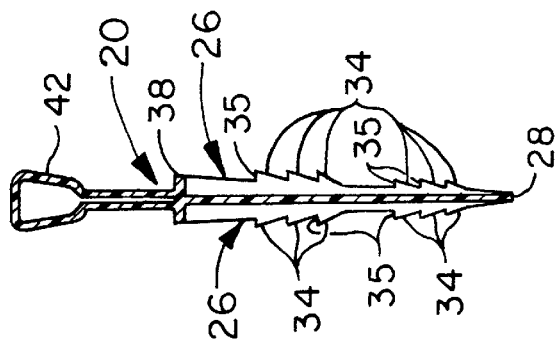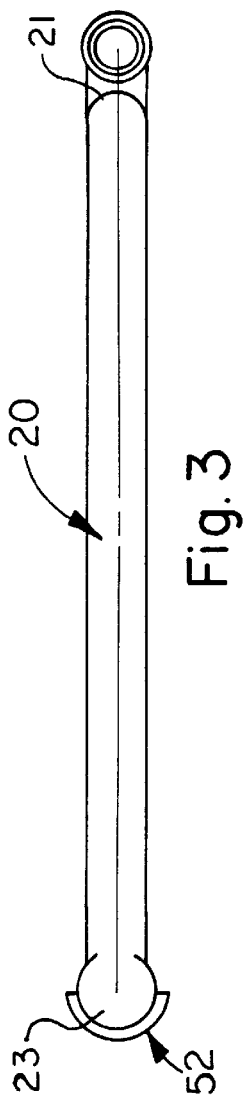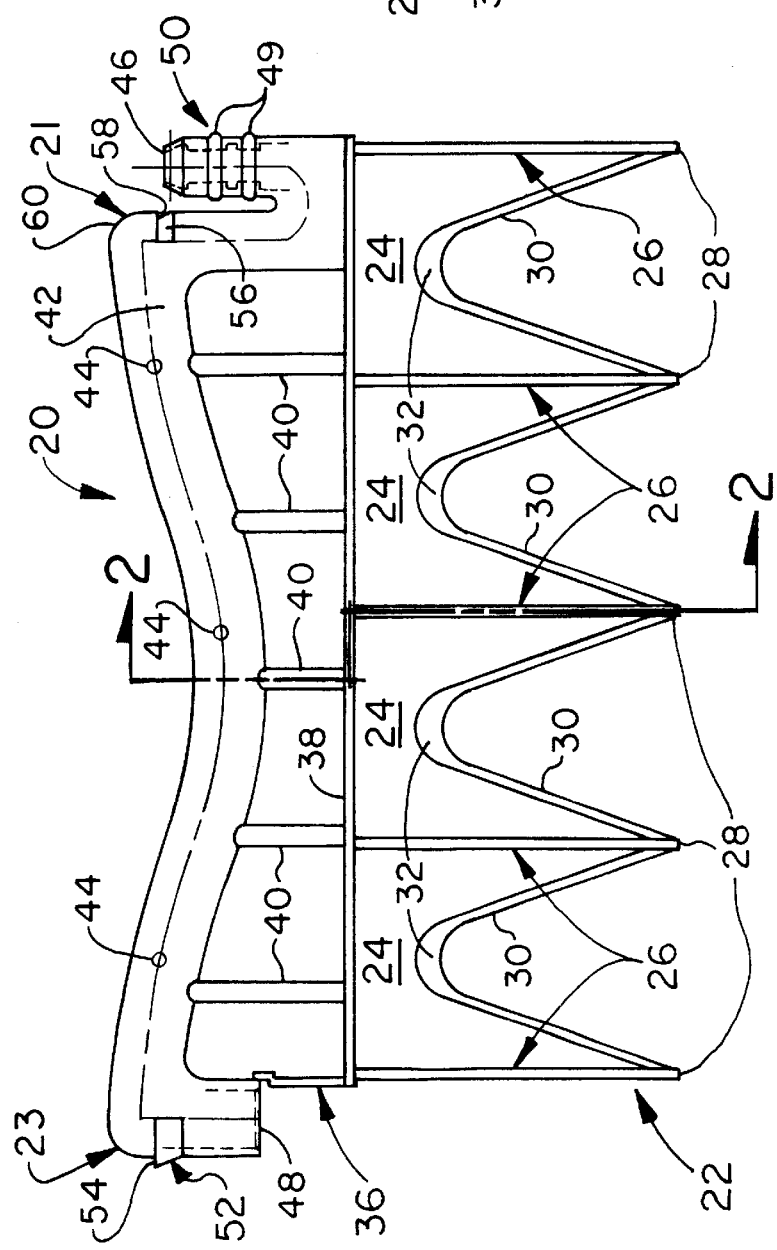

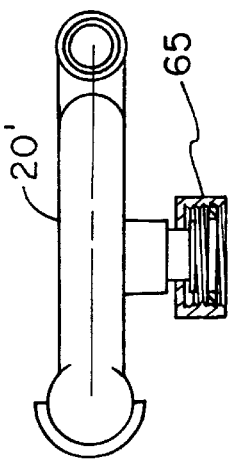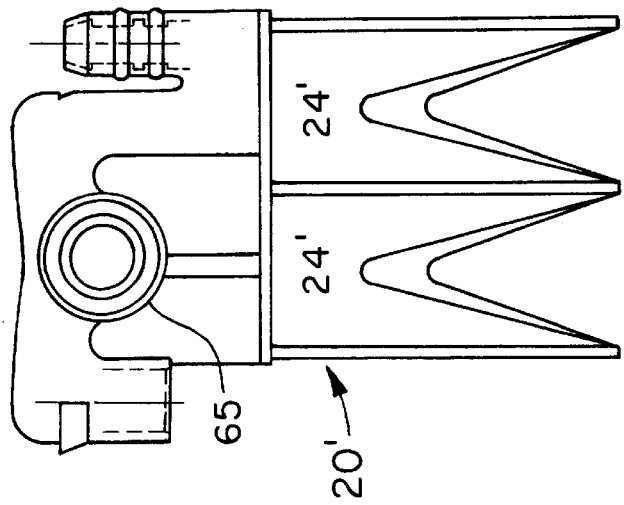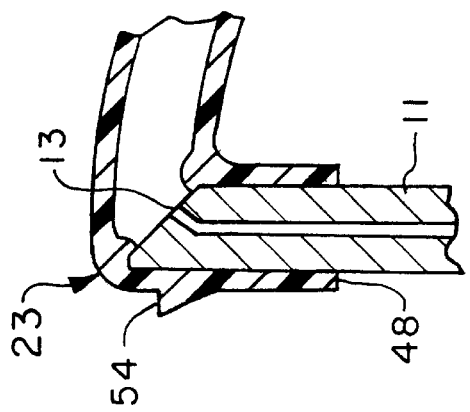

LAWN AND GARDEN EDGING WITH WATERING CAPABILITY

BACKGROUND AND SUMMARY OF THE INVENTION

The present invention is directed to the field of lawn edging. More particularly, the present invention is directed to a lawn and garden edging capable of watering a plot adjacent the edging.

Early attempts at watering lawn or garden plots were accomplished using an anchored sprinkling hose as in U.S. Pat. No. 4,779,800. Most other edging configurations incorporating a watering function have generally been very little more than glorified sprinkler hoses with improved anchors. U.S. Pat. Nos. including 4,702,034; 4,945,675; 5,232,159; and 5,535,545 fall in this category.

Typically, combined watering and edging devices of this type are made in 10–20 foot lengths of flexible material which is coiled in the manner of most edging. The garden or lawn plot that this edging best accommodates is curved or round while most lawns and gardens are square or rectangular. The edging patterns that can be accommodated are limited. Further, the plastics that this flexible, hose-like edging is made of is subject to degradation by rays from the sun causing it to become brittle and can fall victim to freeze/thaw rupture, as well, if not fully evacuated in the fall. Additionally, most of the designs employ separate fixtures for making connections, extra pieces to become separated from the edging and which, if lost, can render the edging at least partially inoperative. These connectors, too, restrict the bends in the region of the junction since stretching can cause the connectors to become dislodged or leak. Several of the edging designs have special sprinkler nozzles attached to the hose portion of the edging. In addition to increasing the complexity and expense of manufacturing such devices, should a nozzle break off the entire 10–20 foot section will fail to operate as designed since the now enlarged orifice will become the path of least resistance so that water will not flow out of the other nozzles.

The lawn edging having watering capability of the present invention remedies these defects. The present lawn edging is made as sections of a rigid (stiff) plastic. Each section, which may range in length from nine inches to two feet but is preferably a foot long, has an integral water conduit extending its entire length with an attached male fitting and a female fitting at opposite ends thereof. These fittings preferably extend vertically so that adjacent sections can pivot on the axis of the attached fittings enabling the lawn edging of the present invention to enclose perimeters of diversely shaped plots. The sections of the lawn edging of the present invention is particularly well adapted to enclose rectangular plots with the right angle turns not kinking the water flow path, as happens with other designs.

A special section is provided for attachment of a water supply to the edging. This section is similar in most respects to the other edging sections with the exception that it is shorter in length and has a female connector to threadingly attach an end of a hose. By inserting the special section in the middle of an extended length of lawn edging, water can be distributed through a substantial length of edging. For example, water was distributed through 40 feet of edging with no indication that the limits of the water pressure had been reached. Each section (special and regular) is comprised of a bottom portion which has a plurality of subsections, with each subsection including insertion facilitating means and removal resisting means. The insertion facilitating means comprises v-shaped points between adjacent subsections and a cutting edge formed on a lead portion of each subsection so that the cutting edge may easily subdivide the soil, cut sod, break up clods, etc., as the edging is pressed or tapped in place. The removal resisting means comprises a series of teeth or ledges formed on a v-shaped laterally protruding flange which extends from each side of each v-shaped point. An upper portion is joined to the lower portion with a lateral reinforcing flange at the juncture. The upper portion has a plurality of reinforcing ribs extending vertically between the flange and the water conduit. The water conduit is generally trapezoidal in cross section with one of its parallel surfaces forming an upper edge of the edging section. This flat upper surface provides a force-receiving portion for application of downward pressure (pressing or tapping) during insertion. The edging of the present invention is available from EMSCO Group, Girard, Pa. under the trademark WATER'S EDGE™ lawn and garden edging.

An additional feature of the present invention involves the method in which the sections are made. The edging of the present invention is formed by injection molding; a gas assist nozzle is used to create the water conduit on the top portion of each section. A tube with a 45° angle on the top forms the surface around which the female fitting is molded. While the insides of the edging section is still molten, a high velocity jet of nitrogen is pushed through the tube, the 45° angle inducing a turn in the direction of the stream which pushes the molten material out the male fitting, effectively coring out the water channel in the upper portion of the edging section.

Other features, advantages and characteristics of the present invention will become apparent after a reading of the following specification.

BRIEF DESCRIPTION OF THE DRAWINGS

The detailed description of the preferred embodiment(s) which follows describes the invention in connection with the attached drawings, like items bearing like reference numerals and in which FIG. 1 is a side view of a section of a preferred embodiment of the lawn edging with watering capability of the present invention;

FIG. 2 is a cross-sectional side view as seen along line 2—2 of FIG. 1;

FIG. 3 is a top view of the embodiment of FIG. 1;

FIG. 3a is a schematic depiction of the process of molding the female fitting.

FIG. 4 is a side view of a special section of lawn edging used to connect the preferred embodiment to a source of water such as a garden hose;

FIG. 5 is a top view of the special section shown in FIG. 4;

DETAILED DESCRIPTION OF THE PREFERRED EMBODIMENT(S)

Figure 6:
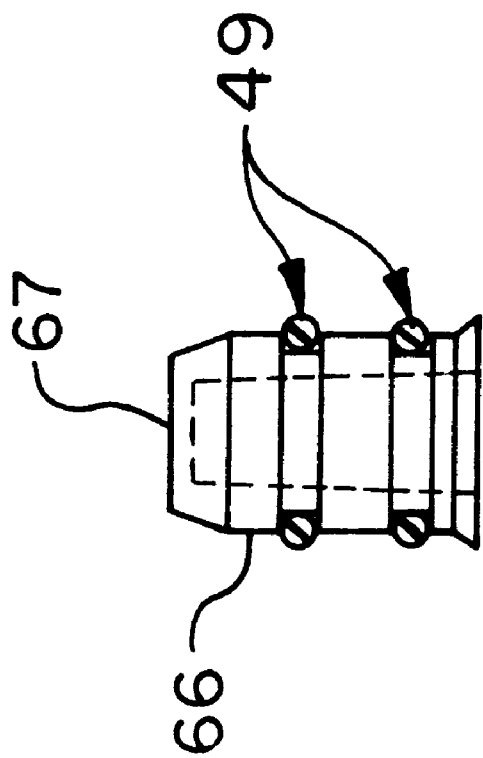
FIG. 6 is a side view of a plug useful with the lawn edging of the present invention.

A single section of the lawn and garden edging with water distribution capability of the present invention is shown in FIGS. 1–3 generally at 20. Section 20 is made of a rigid, high durability plastic material such as PVC. A bottom portion 22 of the section 20 is divided into subsections 24. Each subsection 24 is equipped with insertion facilitating means and removal resisting means 26. The insertion facilitating means includes v-shaped points 28 formed at the lateral extent of each subsection 24 and a cutting edge 30 formed on a leading portion of each v-shaped point 28 and on the radiused junctions 32 of the tops of v-shaped points 28 in the center of each subsection 24. Cutting edge 30 will slice through sod, break up dirt clods and divert pebbles as the edging 20 is pushed or tapped in place. The removal resisting means 26 comprises a laterally protruding flange extending transversely from each v-shaped point out from each planar face of the section 20 at the edges of each subsection 24. The protruding flange 26 has a series of teeth 34 with laterally extending upper surfaces 35 which soil back fills over and inhibits undesired removal.

An upper portion 36 of section 20 is divided from bottom portion 22 by a laterally extending flange 38. Flange 38 reinforces the strength of the section 20 and serves as a limit stop for the distance section 20 can be inserted into the soil. Upper portion 36 has a plurality of vertically extending ribs 40 which reinforce it, said ribs extending between flange 38 and water conduit 42. Water conduit 42 is generally trapezoidal with one of the parallel faces extending generally horizontally and providing a force-receiving surface for insertion. In loose soils such as newly installed gardens, the edging can simply be pushed into the soil to the desired position. In firmer soils, the edging sections 20 can be tapped into place with a rubber mallet. This is an advantage over the extruded edging which lacks the strength to be hammered into place and requires trenching and backfilling for installation. A plurality of water delivery holes 44 are formed in each conduit 42 (shown here as three in the same side). Obviously, the number and placement could vary to produce different sprinkling patterns.

At a first end 21 of conduit 42 is an integrally formed male fitting 46 extending generally vertically and at the opposite end 23 of conduit 42, an integrally formed female fitting 48 also extending generally vertically. Sealing means 50 in the form of two O-rings 49 are positioned on the male fitting 46 and serve to prevent water escaping from between the engaged male and female fittings 46 and 48. With the engaged fittings 46 and 48 extending vertically, a pivot axis is formed so that a section 20 can pivot through angles of between 85° and 275° with respect to an adjacent section affording great flexibility in the configuration of the edging to accommodate diversely shaped plots. A first semi-annular ledge 52 with a flat upper surface 54 is formed on a second end 23 of said section 20 and extends from 180° to 360°.

A second semi-annular ledge with a flat lower surface 58 is formed by recess 56 on a first end 21 of section 20 and extends from 0° to 180°. When adjacent sections 20 are assembled by inserting male fitting 46 in female fitting 48 of the adjacent section, ledge 52 fits in recess 56 and locks the two sections together. The sections can be taken apart by turning one section beyond the 90° limit (i.e., into the 85° or 275° region where ledge 52 and recess 56 are not engaged). When sections 20 are assembled, they may be rotated into this same configuration or the female fitting 48 may simply be axially pressed onto the male fitting 46 causing semi-annular ledge 52 to be compressed for the short distance it has to travel past shoulder 60 of first end 21. Each section 20 is a rigid plastic member having a length of between nine and twenty-four inches. Most preferably, each section 20 is nominally twelve inches in length (center to center on the pivot axes, actual total length of 13 inches).

A special section 20' (FIGS. 4,5) is used to connect the WATER'S EDGE™ lawn and garden edging to a source of water such as an external spigot. Section 20' is similar to section 20 being roughly half as long and having a female connector 65 to enable it to be threadingly connected to a garden hose, (not shown). Although depicted in FIG. 4 as having two subsections 24' of shorter length than those of the section 20, special section 20' preferably has a single standard size subsection 24' and an overall length of approximately ⅓ the length of the full section 20. If special section 20' is positioned in the center of a water distributing section of edging 20, it can provide water flow over a total span of significant length, 40, 50, perhaps even 60, feet. Should the special section be used at one end of the length of edging, then the flow distribution will be limited to one half that distance.

Each section 20, 20' of edging is injection molded using a gas assist technique to vacate the water passageway. A tube 11 having a beveled upper surface 13, as shown in FIG. 3a, is inserted in the mold cavity and forms the surface around which female fitting 48 is molded. While the insides of the edging sections 20, 20' are still molten, a high velocity stream of nitrogen gas is injected through tube 11 which pushes the excess molten material in upper portion 36 out of male fitting 46 creating a flow passageway in conduit 42.

Figure 7:
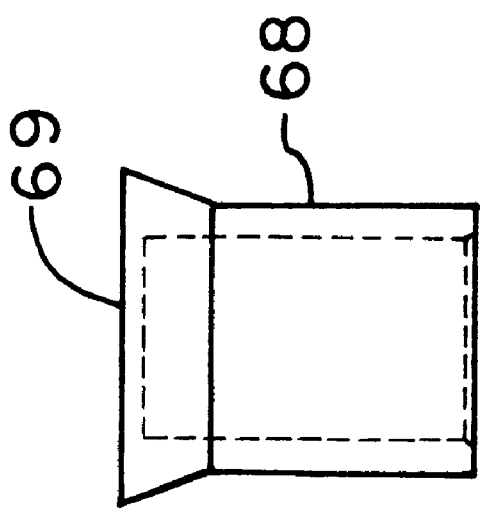
FIG. 7 is a side view of a cap useful with the lawn edging of the present invention.

Plug 66 and cap 68, as shown in FIGS. 6,7, are used to close off the outer most ends of the extended edging so the entire water flowing in through special section 20' will be distributed to the yard plot through holes 44. Plug 66 is configured like male fitting 46, except end 67 is closed, and slips into female fitting 48 to curtail flow through water channel 42 in one direction. Cap 68 is configured like female fitting 48, except for closed end 69, and slips over male fitting 46 on an opposite end of the interconnected lawn edging 20 to curtail flow in the opposite direction. Plug 66 or cap 68 could be used in one side of special section 20' if flow is to be directed only in one direction therefrom.

Various changes, alternatives and modifications will become apparent to one of ordinary skill in the art following a reading of the foregoing specification. One such variation which is contemplated is that sections sold in a box could include four sections labeled 'A', 'B', 'C', and 'D'. The holes in section A would be smaller in diameter than those of section B, those in B smaller than those in section C and those in C than the holes in section D. In use, section A would be attached closest to the special section having the hose fitting. In this way, the water streams would have decreasing lengths and increasing volumes as the distance from the special section increased. It is intended that all such changes, alternatives and modifications as fall within the scope of the appended claims be considered part of this invention.

We claim:

1. Lawn and garden edging with water distribution capability, said edging comprising at least one section of rigid plastic material having a length in a range of between nine inches and two feet, each section including
   a) insertion facilitating means;
   b) removal resisting means;
   c) a water conduit extending substantially the entire length of said section and including
      i) a plurality of openings in a first side of said conduit to spray water on a designated plot,
      ii) an integral male fitting for connection to an adjacent section formed on a first end of said conduit and extending in a first substantially vertical direction,
      iii) an integral female fitting for connection to said male fitting of an adjacent section formed on a second opposite end of said conduit and extending in a second substantially opposite vertical direction; whereby an axis defined by a pair of interconnected male and female fittings of adjacent sections serves as a pivot axis for angular rotation of one section relative to said adjacent section.

2. The edging of claim 1 wherein each section includes a lower portion with a plurality of subsections and said insertion facilitating means comprises a plurality of v-shaped points between adjacent subsections.

3. The edging of claim 2 wherein said insertion facilitating means further comprises a cutting edge formed on a lead portion of each subsection.

4. The edging of claim 3 wherein said insertion facilitating means further comprises a flat upper surface for receiving an insertion force, said water conduit being generally trapezoidal in cross section with one of a pair of parallel sides forming said flat upper surface.

5. The edging of claim 3 wherein said removal resisting means comprises a series of teeth formed on a v-shaped laterally protruding flange which extends from each side of each v-shaped point.

6. The edging of claim 2 further comprising an upper portion attached to said lower portion, said upper portion being separated from said lower portion by a laterally extending flange.

7. The edging of claim 6 wherein an upper extent of said upper portion is defined by said water conduit, and said upper portion has a plurality of vertical ribs extending between said laterally extending flange and said water conduit.

8. The edging of claim 1 further comprising sealing means formed on each of said male fittings.

9. The edging of claim 8 wherein said sealing means comprises a pair of spaced O-rings formed along said male fitting to doubly seal said male fitting in said female fitting.

10. The edging of claim 1 further comprising a first semi-annular ledge formed on and extending approximately 180° about a circumferential portion of one of said first and second ends, said first semi-annular ledge having a flat upper surface.

11. The edging of claim 10 further comprising a second semi-annular ledge formed on and extending approximately 180° about a circumferential portion of another of said first and second ends by a recess therein, said second semi-annular ledge having a flat lower surface for engaging said first semi-annular ledge of an adjacent section and maintaining said adjacent section connected thereto.

12. The edging of claim 11 further comprising a female cap positionable over a male fitting of a last in a series of sections to be interconnected on a first end of said series and a male plug positionable in said female fitting of a last in a series of sections to be interconnected on a second opposite end of said series to close off said first and second ends so water flows out of said openings in said conduit, said female cap and said male plug being substantially identically shaped to their counterpart female fitting and male fitting, respectively, except that each blocks the flow of water.

13. The edging of claim 1 further comprising a special section for interconnecting a plurality of connected edging sections to a water source said special section including a) a water conduit extending substantially the entire length of said section;

b) an integral male fitting for connection to an adjacent section formed on a first end of said conduit and extending in a first substantially vertical direction;

c) an integral female fitting for connection to said male fitting of an adjacent section formed on a second opposite end of said conduit and extending in a second substantially opposite vertical direction;

d) a female fitting for threadingly attaching to an end of a hose, said female fitting being positioned on a side of said conduit intermediate said first and second ends thereof.

14. The edging of claim 1 comprising several pluralities of sections each or said pluralities having different size openings for spraying water than any of the other pluralities.

15. Lawn and garden edging with water distribution capability, said edging comprising at least one section of rigid plastic material having a length in a range of between nine inches and two feet, each section including a) insertion facilitating means;

b) removal resisting means;

c) a water conduit extending substantially the entire length of said section between first and second ends and including a plurality of openings in a first side of said conduit to spray water on a designated plot;

d) a first semi-annular ledge formed on and extending approximately 180° about a circumferential portion of one of said first and second ends, said first semi-annular ledge having a flat upper surface;

e) a second semi-annular ledge formed on and extending approximately 180° about a circumferential portion of the other of said first and second ends by a recess therein, said second semi-annular ledge having a flat lower surface for engaging said first semi-annular ledge of an adjacent section and maintaining said adjacent section connected thereto by inhibiting relative vertical movement.

16. The edging of claim 15 further comprising a male fitting integral with one of said first and second ends and a female fitting integral with the other of said first and second ends, said male and female fittings extending in substantially opposite vertical directions whereby one section is interconnected to an adjacent section by inserting said male fitting into said female fitting, a pivot axis is defined.

17. The edging of claim 16 wherein said first semi-annular ledge is formed on a shoulder portion of one of said male and female fittings and said second semi-annular ledge is formed on the other of said male and female fittings.

* * * * *